(12) United States Patent
Jang et al.

(10) Patent No.: US 12,522,723 B2
(45) Date of Patent: Jan. 13, 2026

(54) POLYPROPYLENE THERMOPLASTIC RESIN COMPOSITION AND MOLDED ARTICLE MANUFACTURED USING THE SAME

(71) Applicants: Hyundai Motor Company, Seoul (KR); Kia Corporation, Seoul (KR); GS Caltex Corporation, Seoul (KR)

(72) Inventors: Kyeong Hoon Jang, Seoul (KR); Boo Youn An, Gyeonggi-do (KR); Dae Sik Kim, Gyeonggi-do (KR); Jin Gi Ahn, Seoul (KR); In Soo Han, Gyeonggi-do (KR); Seul Yi, Seoul (KR); Hyung Tak Lee, Daejeon (KR); Kwang Il Kwon, Daejeon (KR)

(73) Assignees: Hyundai Motor Company, Seoul (KR); Kia Corporation, Seoul (KR); GS Caltex Corporation, Seoul (KR)

( * ) Notice: Subject to any disclaimer, the term of this patent is extended or adjusted under 35 U.S.C. 154(b) by 413 days.

(21) Appl. No.: 17/979,267

(22) Filed: Nov. 2, 2022

(65) Prior Publication Data

US 2023/0144039 A1 May 11, 2023

(30) Foreign Application Priority Data

Nov. 5, 2021 (KR) .......................... 10-2021-0151427

(51) Int. Cl.
*C08L 23/12* (2006.01)

(52) U.S. Cl.
CPC ........... *C08L 23/12* (2013.01); *C08L 2205/02* (2013.01)

(58) Field of Classification Search
CPC ............................ C08L 23/12; C08L 2205/02
See application file for complete search history.

(56) References Cited

U.S. PATENT DOCUMENTS

2016/0329445 A1 11/2016 Zhao et al.
2017/0226327 A1* 8/2017 Kabeya ..................... C08K 7/02

FOREIGN PATENT DOCUMENTS

| CN | 105017638 A | 11/2015 |
| JP | H11349781 A | 12/1999 |
| JP | 2003-221454 A | 8/2003 |
| KR | 100702401 B1 | 4/2007 |
| KR | 101362069 B1 | 2/2014 |
| KR | 2014-0084749 A | 7/2014 |
| KR | 101439152 B1 | 9/2014 |
| KR | 2017-0043720 A | 4/2017 |
| WO | WO-2017125462 A1 * | 7/2017 ............. C08J 7/123 |

* cited by examiner

*Primary Examiner* — Catherine S Branch
*Assistant Examiner* — Andrea Wu
(74) *Attorney, Agent, or Firm* — Fox Rothschild LLP

(57) ABSTRACT

Disclosed are polypropylene thermoplastic resin composition containing a high crystalline homo polypropylene resin, a long glass fiber reinforced material, a modified polypropylene resin, and a nucleating agent having a structure including amino azobenzene or a derivative thereof.

6 Claims, No Drawings

POLYPROPYLENE THERMOPLASTIC RESIN COMPOSITION AND MOLDED ARTICLE MANUFACTURED USING THE SAME

CROSS-REFERENCE TO RELATED APPLICATION

This application claims under 35 U.S.C. § 119(a) the benefit of priority to Korean Patent Application No. 10-2021-0151427 filed on Nov. 5, 2021, the entire contents of which are incorporated herein by reference.

TECHNICAL FIELD

The present disclosure relates to a thermoplastic resin composition containing a high crystalline homo polypropylene resin, a glass fiber reinforced material, a modified polypropylene resin, and nucleating agent having a structure comprising amino azobenzene or a derivative thereof.

BACKGROUND

Recently, the vehicle industry is in the trend of light weight, high grade, and eco-friendliness. In particular, efforts have been continuously made in the vehicle industry to reduce the weight of the vehicle because the weight of the vehicle closely affects the fuel efficiency and traveling performance of the vehicle.

For example, in the related art, a steel plate has been used as a material for a fender, a tailgate, etc., but plastic has also been applied thereto in order to reduce the weight of a panel of a vehicle body. Further, plastic has been applied to frames such as a front-end module carrier frame and a panoramic sunroof frame module.

A cowl cross member is a skeletal structure that is equipped with various electronic components of an instrument panel and serves to prevent bending or distortion of a driver seat of the vehicle in the left and right directions and increase durability of a vehicle body. The cowl cross member has been mainly made of steel because it requires high physical properties to withstand shock from the outside.

A non-ferrous metal such as aluminum alloy or magnesium alloy, which is lighter in weight than steel, has been applied and developed to reduce the weight of the vehicle, but has an insufficient light-weight effect due to a higher specific gravity than the plastic material and therefore, the plastic material has been reviewed.

The plastic material is lighter than a metal material but cannot satisfy the high physical property requirements necessary for the cowl cross member. Therefore, it is known as being developed in an over molding method for reinforcing by inserting the metal material such as steel or aluminum alloy.

For example, polypropylene has been widely used to reduce the weights of various products because of its excellent moldability and economy feasibility and a low specific gravity of about 1.0 or less. However, to use polypropylene for the cowl cross member of the vehicle, it is necessary to strengthen rigidity thereof, etc., and there is need to develop a material to improve the insufficient physical properties such as the mechanical strength and heat deflection temperature of the polypropylene resin.

The above information disclosed in this Background section is only for enhancement of understanding of the background of the disclosure and accordingly it may include information that does not form the prior art that is already known in this country to a person of ordinary skill in the art.

SUMMARY

In preferred aspects, provided are compositions that may be applied to a cowl cross member having excellent mechanical strength and light weight property and may be used for manufacturing a molded article having improved shock strength and mechanical strength.

Also provided is a method capable of improving the mechanical strength of a molded article by increasing the degree of crystallinity.

The objects of the present disclosure are not limited to the aforementioned objects. The objects of the present disclosure will be more apparent by the following description and will be realized by means described in the claims and a combination thereof.

In an aspect, provided is a polypropylene thermoplastic resin composition may include a high crystalline homo polypropylene resin, a glass fiber reinforced material, a modified polypropylene resin, and a nucleating agent having a structure comprising amino azobenzene or a derivative thereof.

The "high crystalline homo polypropylene" as used herein refers to a resin produced from polymerizing only or substantially propylenes and formed in high rigivity regularity by close packing of propylene chains. The high crystalline homo polypropylene may provide high strength to weight ratio and improved chemical resistance due to tight repeating units of propylene.

The "glass fiber reinforced material" as used herein suitably may include multiple yarns containing glass filaments or fibers. Exemplary glass filaments and glass fibers may include composites of glass and non-glass materials, for example such as glass-polyester blends or glass-olefin composites (e.g. Twintex®, St. Gobain Corporation) and other olefin coated C or E glass fibers and fabrics. In addition, a "glass" can be considered an inorganic product of fusion that has cooled to a rigid condition without crystallizing. For instance, a glass fiber suitably may be spun from an inorganic product of fusion that has cooled to a rigid condition without crystallizing.

The "amino azobenzene derivative" as used herein refers to a compound having a core structure of amino azobenzene and further containing one or more functional groups or substitutents at any position as long as the valency of radicals are allowed.

The high crystalline homo polypropylene resin may have a pentad fraction of about 97% or greater measured by $^{13}$C-NMR.

The term "pentad fraction" as known in the related art and used herein refers to a measurement of tacticity or stereochemistry at chical centers (e.g., chiral carbon). As the pentad fraction increases, it is interpreted as the number of stereochemistry are increasingly same or uniform, thus higher the percentage or fraction, the higher number of fractions are having same stereochemicstry.

The high crystalline homo polypropylene resin may have a number average molecular weight of about 40,000 to 100,000.

The glass fiber reinforced material may have an average diameter of about 10 to 20 µm and an average length of about 3 to 15 mm. The modified polypropylene resin may be obtained by grafting maleic anhydride to polypropylene.

The modified polypropylene resin may include grafting maleic anhydride at about 6 to 10 wt % based on the total weight of the modified polypropylene resin.

The nucleating agent may include a compound represented by Formula 1 below.

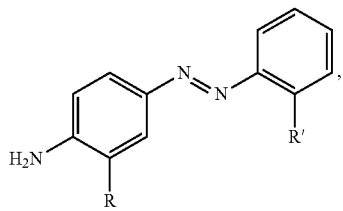

Formula 1 wherein R and R' are the same as or different from each other and are each independently a hydrogen atom, or a substituted or unsubstituted alkyl group.

The nucleating agent may include 4'-amino-2,3'-dimethylazobenzene.

In an aspect, provided is a molded article may include the polypropylene thermoplastic resin composition as described herein.

The molded article may be a cowl cross member for a vehicle.

Also provided is a vehicle that may include the molded article, e.g., cowl cross member, as described herein.

According to various exemplary embodiments of the present disclosure, the composition can be applied to the cowl cross member having excellent mechanical strength and light weight property.

According to various exemplary embodiments of the present disclosure, the composition can be used for manufacturing the molded article having improved shock strength and mechanical strength.

According to various exemplary embodiments of the present disclosure, the method may improve the mechanical strength of the molded article by increasing the degree of crystallinity.

The effects of the present disclosure are not limited to the aforementioned effects. The effects of the present disclosure should be understood as including all effects inferable from the following description.

Other aspects of the disclosure are disclosed infra.

DETAILED DESCRIPTION

The above objects, other objects, features, and advantages of the present disclosure will be readily understood through the following preferred exemplary embodiments related to the accompanying drawings. However, the present disclosure is not limited to the exemplary embodiments described herein and may also be specified in other forms. Rather, the exemplary embodiments described herein are provided so that the disclosed contents can be thorough and complete and the technical spirit of the present disclosure may be sufficiently conveyed to those skilled in the art.

In the present specification, it should be understood that the term "include" or "have" is intended to specify the presence of features, numbers, steps, operations, components, parts or combinations thereof described in the specification, and does not preclude the possibility of the presence or addition of one or more other features or numbers, steps, operations, components, parts or combinations thereof in advance. In addition, if a portion such as a layer, a membrane, a region, or a plate is said to be "on" another portion, this includes not only a case where it is "directly above" another portion, but also a case where it has other portions interposed therebetween. Conversely, if a portion such as a layer, a membrane, a region, or a plate is said to be "under" another portion, this includes not only a case where it is "directly under" another portion, but also a case where it has other portions interposed therebetween.

Unless otherwise specified, since all numbers, values, and/or expressions representing components, reaction conditions, polymer compositions, and an amount of mixtures used in the present specification are approximations reflecting various uncertainties of measurements that these numbers essentially occur in obtaining these values from the others, it should be understood that all cases are modified by the term "about". Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In addition, if the numerical range is disclosed in the present disclosure, this range is continuous, and includes all values from the minimum value to the maximum value in this range, unless indicated otherwise. Furthermore, if this range refers to an integer, this range includes all integers including the minimum value to the maximum value, unless otherwise indicated. In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

It is understood that the term "automotive" or "vehicular" or other similar term as used herein is inclusive of motor automotives in general such as passenger automobiles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

The present disclosure relates to a polypropylene thermoplastic resin composition containing a high crystalline homo polypropylene resin, a glass fiber reinforced material, a modified polypropylene resin, and a nucleating agent having a structure comprising amino azobenzene or a derivative thereof. The composition may be provided for manufacturing a molded vehicle part, e.g., a cowl cross member for a vehicle and manufactured by using a glass fiber reinforced polypropylene thermoplastic resin composition.

Hereinafter, each configuration will be described.

High Crystalline Homo Polypropylene Resin

The high crystalline homo polypropylene resin may have a pentad fraction of about 97% or greater measured by 13C-NMR. At this time, when the pentad fraction is less than about 96%, the rigidity and heat resistance of a molded article may be reduced, and when it is less than about 97%, the mechanical strength of the molded article may be reduced.

The high crystalline homo polypropylene resin has a number average molecular weight of about 40,000 to 100,000.

The polypropylene thermoplastic resin composition may suitably include an amount of about 40 to 60 wt % of a high crystalline homo polypropylene resin based on the total weight of the polypropylene thermoplastic resin composition.

Glass Fiber Reinforced Material

The glass fiber reinforced material preferably has an average diameter of about 10 to 20 μm, and an average length of about 3 to 15 mm. When the average length is equal to or less than about 3 mm, the shock strength and mechanical rigidity of the molded article may be reduced, and when it is greater than about 15 mm, the injection molding processability may be reduced because the long glass fiber reinforced material is not input well from a hopper of a molding machine to a cylinder.

The long glass fiber reinforced polypropylene thermoplastic resin composition may include an amount of about 40 to 60 wt % of the long glass fiber reinforced material based on the total weight of the thermoplastic resin composition.

Modified Polypropylene Resin

The modified polypropylene resin is obtained by grafting maleic anhydride to polypropylene, and preferably includes maleic anhydride to polypropylene at a ratio of about 6 to 10 wt % based on a total amount of the modified polypropylene resin. When the graft ratio is less than about 6 wt %, an interfacial adhesion between the long glass fiber reinforced material and a polypropylene matrix may be weak, which may reduce the mechanical rigidity of the molded article. When the graft ratio is greater than about 10 wt %, the shock strength of the molded article may be reduced.

The glass fiber reinforced polypropylene thermoplastic resin composition may suitably include an amount of about 3 to 5 wt % of the modified polypropylene resin based on the total weight of the thermoplastic resin composition.

Nucleating Agent

The nucleating agent may include a compound represented by Formula 1 below.

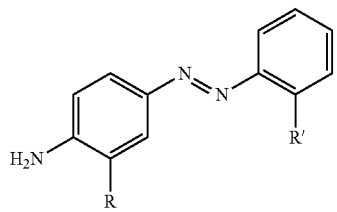

Formula 1

In Formula 1, R and R' are the same as or different from each other and are each independently a hydrogen atom, or a substituted or unsubstituted alkyl group.

Preferably, the amino azobenzene-based nucleating agent may contain 4'-amino-2,3'-dimethylazobenzene in which each of R and R' in Formula 1 contains an alkyl group (—CH₃).

The thermoplastic resin composition may suitably include an amount of about 0.5 to 3 wt % of the nucleating agent based on the total weight of the thermoplastic resin composition. When the content of the amino azobenzene-based nucleating agent is less than about 0.5 wt %, the mechanical strength of the molded article such as tensile strength, bending strength, and bending elastic modulus may be reduced, and when it is greater than about 3 wt %, the shock strength of the molded article may be reduced.

In an aspect, provided is a molded article manufactured by using the thermoplastic resin composition as described herein. The molded article may preferably be a cowl cross member for a vehicle.

EXAMPLE

Hereinafter, the present disclosure will be described in more detail through specific examples. However, these examples are for illustrating the present disclosure, and the scope of the present disclosure is not limited thereby.

Examples and Comparative Examples

Specimens were manufactured by extruding and then inject-molding each of the resin compositions prepared with the composition components shown in Table 1 below by using a twin-screw extruder and a pultrusion machine.

TABLE 1

| Items | | Example (wt %) | | Comparative Example (wt %) | | | | | | | | | |
|---|---|---|---|---|---|---|---|---|---|---|---|---|---|
| — | | 1 | 2 | 1 | 2 | 3 | 4 | 5 | 6 | 7 | 8 | 9 | 10 |
| (A)* | | 45 | 43 | 45 | 45 | 45 | 45 | 45 | 47 | 43 | 45 | 45.7 | 42 |
| (B) | (B1)* | 50 | 50 | | | | 50 | 50 | 50 | 50 | 50 | 50 | 50 |
| | (B2)* | | | 50 | | | | | | | | | |
| | (B3)* | | | | 50 | | | | | | | | |
| | (B4)* | | | | | 50 | | | | | | | |
| (C) | (C1)* | 4 | 5 | 4 | 4 | 4 | | | 2 | 6 | 4 | 4 | 4 |
| | (C2)* | | | | | | 4 | | | | | | |
| | (C3)* | | | | | | | 4 | | | | | |

TABLE 1-continued

| Items | | Example (wt %) | | Comparative Example (wt %) | | | | | | | | | |
|---|---|---|---|---|---|---|---|---|---|---|---|---|---|
| — | | 1 | 2 | 1 | 2 | 3 | 4 | 5 | 6 | 7 | 8 | 9 | 10 |
| (D) | (D1) * | 1 | 2 | 1 | 1 | 1 | 1 | 1 | 1 | 1 | | 0.3 | 3.5 |
| | (D2) * | | | | | | | | | | 1 | | |
| total | | 100 | 100 | 100 | 100 | 100 | 100 | 100 | 100 | 100 | 100 | 100 | 100 |

(A): High crystalline homo polypropylene resin (the pentad fraction measured by 13-NMR is 97%, and the number average molecular weight is 50,000)
(B1): Long glass fiber (cross-sectional diameter 17 μm, length 10 mm)
(B2): Long glass fiber (cross-sectional diameter 7 μm, length 10 mm)
(B3): Long glass fiber (cross-sectional diameter 23 μm, length 10 mm)
(B4): Long glass fiber (cross-sectional diameter 17 μm, length 2 mm)
(C1): Modified polypropylene resin (obtained by grafting maleic anhydride to polypropylene at 8%)
(C2): Modified polypropylene resin (obtained by grafting maleic anhydride to polypropylene at 5%)
(C3): Modified polypropylene resin (obtained by grafting maleic anhydride to polypropylene at 11%)
(D1): 4'-amino-2,3'-dimethylazobenzene
(D2): Dibenzylidene sorbitol Experimental Example The results obtained by measuring the tensile strength, tensile elastic modulus, shock strength, bending strength, bending elastic modulus, and heat deflection temperature of the specimens manufactured in the Examples and Comparative Examples by using the following measurement method are shown in Table 2 below.

Measurement Method
(1) Tensile strength (MPa): The tensile strength was measured according to ISO 527 standard code
(2) Tensile elastic modulus (MPa): The tensile elastic modulus was measured according to the ISO 527 standard code
(3) IZOD shock strength (KJ/m$^2$): The IZOD shock strength was measured at room temperature (23° C.) and low temperature (−30° C.) under the ¼" notched condition according to ISO 180 standard code
(4) Bending strength (MPa): The bending strength was measured according to ISO 178 standard code
(5) Bending elastic modulus (MPa): The bending elastic modulus was measured according to the ISO 178 standard code
(6) Heat deflection temperature (° C.): The heat deflection temperature was measured by applying a surface pressure of 1.82 MPa according to ISO 75 standard code As shown in Table 2, the specimens according to Examples 1 and 2 showed superior results in tensile strength, the tensile elastic modulus, the bending strength, the bending elastic modulus, the IZOD shock strength, and the heat deflection temperature to Comparative Examples.

As described above, while the experimental examples and examples according to the present disclosure have been described in detail, the scope of the present disclosure is not limited to the aforementioned experimental examples and examples, and various modifications and improvements by those skilled in the art using the basic concept of the present disclosure defined by the appended claims are also included in the scope of the present disclosure.

What is claimed is:
1. A thermoplastic resin composition comprising:
   40 to 60 wt % of a high crystalline homo polypropylene resin;
   50 to 60 wt % of a long glass fiber reinforced material;
   4 to 5 wt % of a modified polypropylene resin; and
   1 to 3 wt % of a nucleating agent having a structure comprising amino azobenzene or a derivative thereof,
   wherein the long glass fiber reinforced material has an average diameter of 10 μm to 20 μm and an average length of 3 mm to 15 mm,
   wherein the modified polypropylene resin is obtained by grafting maleic anhydride to polypropylene,

TABLE 2

| Items | Example | | Comparative Example | | | | | | | | | |
|---|---|---|---|---|---|---|---|---|---|---|---|---|
| — | 1 | 2 | 1 | 2 | 3 | 4 | 5 | 6 | 7 | 8 | 9 | 10 |
| Tensile strength | 155 | 160 | 147 | 145 | 135 | 131 | 145 | 146 | 149 | 132 | 137 | 151 |
| Tensile elastic modulus | 12,500 | 12,700 | 11,700 | 11,500 | 11,000 | 11,200 | 11,500 | 11,300 | 11,700 | 10,400 | 10,700 | 12,000 |
| Bending strength | 210 | 212 | 205 | 200 | 178 | 172 | 197 | 195 | 201 | 182 | 185 | 203 |
| Bending elastic modulus | 12000 | 12100 | 11500 | 11000 | 10700 | 10500 | 11100 | 10800 | 11200 | 10100 | 10200 | 11300 |
| IZOD (23° C.) | 30 | 32 | 17 | 21 | 13 | 22 | 25 | 25 | 17 | 27 | 25 | 15 |
| IZOD (−30° C.) | 30 | 31 | 16 | 20 | 12 | 21 | 23 | 24 | 16 | 26 | 22 | 14 |
| Heat deflection temperature | 160 | 161 | 157 | 158 | 157 | 158 | 155 | 156 | 157 | 154 | 155 | 157 | wherein the modified polypropylene resin comprises maleic anhydride at a ratio of 6 wt % to 10 wt % based on the total weight of the modified polypropylene resin, wherein the nucleating agent comprises 4'-amino-2,3'-dimethylazobenzene.

2. The polypropylene thermoplastic resin composition of claim 1, wherein the high crystalline homo polypropylene resin has a pentad fraction of about 97% or more measured by $^{13}$C-NMR.

3. The polypropylene thermoplastic resin composition of claim 1, wherein the high crystalline homo polypropylene resin has a number average molecular weight of about 40,000 to 100,000.

4. A molded article manufactured by comprising a polypropylene thermoplastic resin composition of claim 1.

5. The molded article of claim 4,
wherein the molded article is a cowl cross member for a vehicle.

6. A vehicle comprising a molded article of claim 4.

\* \* \* \* \*